April 26, 1966 R. HAINES, JR 3,247,550
APPARATUS FOR MOLDING COMPOSITE PLASTIC PRODUCTS
Filed April 18, 1962 2 Sheets-Sheet 1
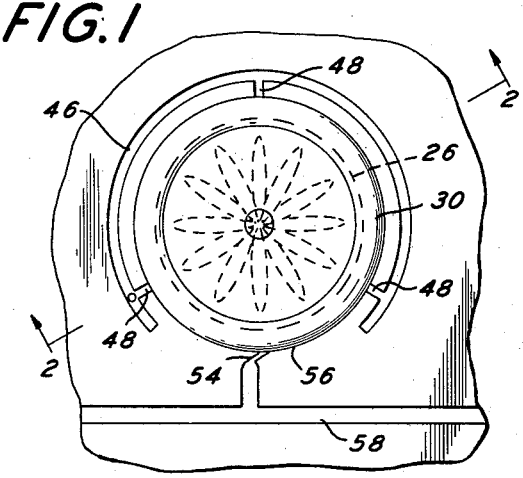
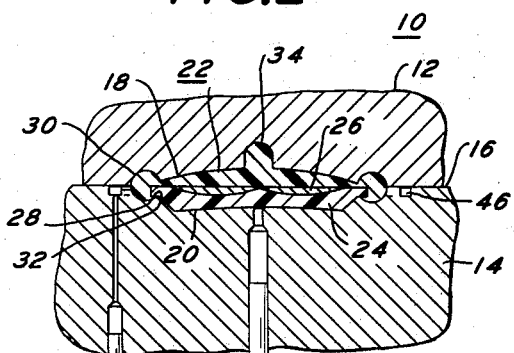
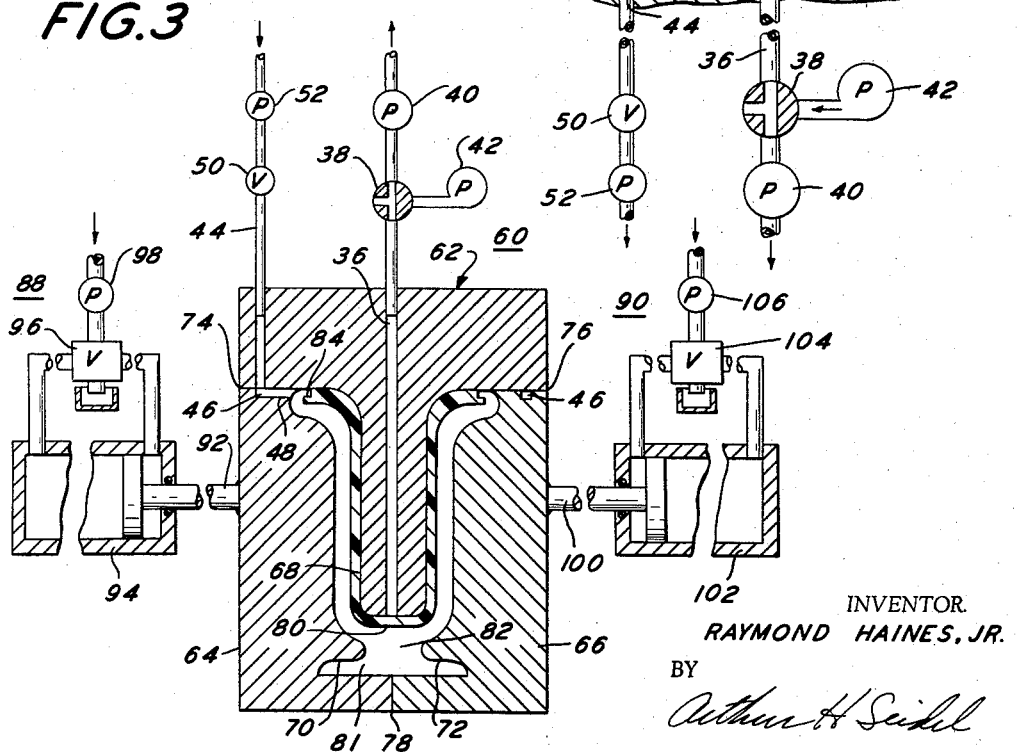
INVENTOR.
RAYMOND HAINES, JR.
BY
ATTORNEY April 26, 1966 R. HAINES, JR 3,247,550
APPARATUS FOR MOLDING COMPOSITE PLASTIC PRODUCTS
Filed April 18, 1962 2 Sheets-Sheet 2

INVENTOR.
RAYMOND HAINES, JR.
BY
*Arthur H. Seidel*
ATTORNEY

United States Patent Office

3,247,550
Patented Apr. 26, 1966

3,247,550
APPARATUS FOR MOLDING COMPOSITE
PLASTIC PRODUCTS
Raymond Haines, Jr., 711 Lawrence Lane, Ambler, Pa.
Filed Apr. 18, 1962, Ser. No. 188,327
1 Claim. (Cl. 18—36)

In general, this invention relates to an apparatus for injection molding one or more pre-molded inserts into a completely fused decorative plastic product or item. More particularly, it relates to an apparatus for injection molding wherein a decorated plastic insert may be molded into a finished product without destroying the insert or the decorative surface of the same in the process.

Heretofore, if one desired to manufacture a plastic product having a plastic insert therein, it was necessary to manufacture the molded article so that the plastic insert might be press-fitted into the molded article. This necessitated extremely close tolerances in the manufacture of the plastic product and the insert so that the press fit would be operative to hold the insert in the product.

If it were desired to manufacture a plastic product with an insert through a molding operation, certain other problems arose. One of these problems was the necessity of providing pins, clamps or fixtures within the mold assembly to hold the plastic insert in place during the molding operation. This necessitated an expensive and clumsy mold assembly. Another problem was the plasticizing of the insert during the molding operation. When hot thermoplastic material was injected into the mold cavity it melted the decorative insert, ruining the insert, and causing distortion of the molded product. Additionally, the injection of the molded material into the mold cavity caused compression of the air in the mold cavity and slowed down the injection cycle as the cavity did not fill with great rapidity.

The plastic products which are manufactured by this invention included buttons, vases, trays, dishes, combs, plaques, sunglasses, plastic cabinets and table tops. Any one of these and other products or items which utilize decorative plastic inserts may be manufactured by this process.

It is the general object of the invention to avoid and overcome the foregoing and other difficulties of and objections to prior art practices by the provision of a better injection molding method for manufacturing plastic products having pre-molded parts or inserts.

Another object is to provide a better method for injection molding a plastic product having a pre-molded insert in which the insert is held in place in the mold by means of vacuum.

Another object of this invention is to provide a better and more simple injection molding apparatus for manufacturing plastic products in which a pre-molded part is inserted into a secondary mold and plastic material is formed around the insert to hold the insert in place in the finished product without destroying the insert or the decorative surface of the insert in the process.

Another object of this invention is to provide a better injection molding system for manufacturing plastic products having pre-molded inserts in which the injected plastic material is supplied at a lower than normal molding temperature.

Another object of this invention is to provide a simple method of manufacturing plastic products having pre-molded inserts in which the mold cavity is evacuated prior to the injection of the molding material.

The aforesaid objects of the invention and other objects which will become apparent as the description proceeds, are achieved by providing an injection molding machine having a mold cavity therein. Into the mold cavity is placed a decorative plastic insert which is to become part of the ultimate plastic product. The plastic insert is held in place in the mold cavity by providing a suction behind the insert to hold the insert in place against one face of the mold cavity. The plastic insert has a flange thereon so that when molded material is injected into the cavity it will hold the insert mechanically in the molded product. Prior to the injection of the molded material into the mold, the mold cavity is evacuated so as to allow the plastic material to be injected into the cavity to fill the cavity more quickly than in usual injection molding techniques and also at a lower molding temperature than normally used. The molding material is also injected peripherally around the edge of the mold cavity so as to completely fill the mold cavity. Since the molding material is fed at a lower than normal temperature and is not forced to compress the air in the cavity, it will not distort the plastic insert in the mold cavity but will flow easily around the insert and will fuse to the insert without damaging the decorative surface thereof.

For the purpose of illustrating the invention there is shown in the drawings form which are presently preferred; it being understood, however, that this invention is not limited to the precise arrangements and instrumentalities shown.

FIGURE 1 is a top view of a button making machine with the top planten removed which utilizes the principles of the present invention.

FIGURE 2 is a side cross sectional view of the button making machine shown in FIGURE 1 taken along lines 2—2 with the top platen in place.

FIGURE 3 is a cross sectional view of a cup molding machine utilizing the principles of the present invention.

Figure 4:
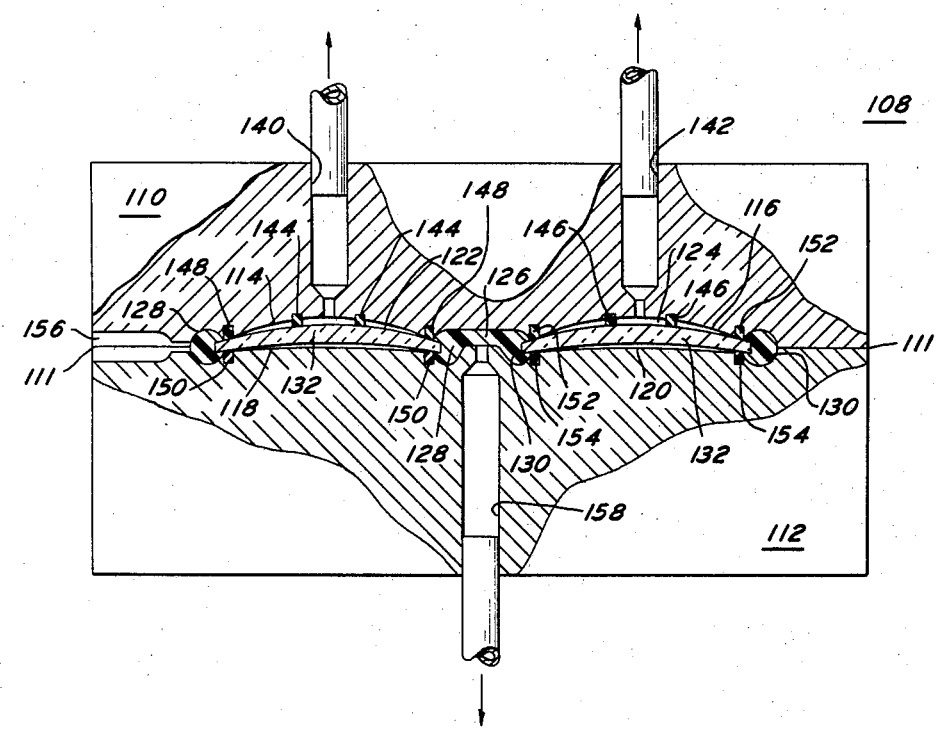
FIGURE 4 is a cross sectional view of an eyeglass molding machine utilizing the principles of the present invention.

Referring to the drawings wherein like numerals refer to like elements, there is shown in FIGURE 1 a button molding machine generally designated by the numeral 10.

The button molding apparatus consists of an upper stationary platen 12 and a lower movable platen 14. The platen 14 is movable into and out of cooperation with the upper platen 12 by a piston (not shown). A parting line 16 defines the meeting point between the upper and lower platens 12 and 14. The face of the upper platen 12 has an indentation 18 therein cooperating with an indentation 20 in the face of the lower platen 14 to form a mold cavity 22 therebetween. A plastic insert 24 is placed in the mating indentation 20 in the face of the lower platen 14.

The plastic insert 24 has indentations 26 on the face opposite the upper platen 12. The indentations 26 are adapted to have decorative material placed therein so as to comprise a design on the face of the insert 24. The insert 24 has been pre-molded and is in its normal usage manufactured from a thermoplastic resin.

The plastic insert 24 has an annular flange 28 around the edge thereof. As shown in FIGURE 2, the upper platen 12 is adapted to have plastic material injected into the mold cavity which forms the back main body 30 of the button. The back main body 30 of the button has an annular lip portion 32 which matingly engages with the flange 28 to hold the plastic insert 24 securely in the back main body 30 of the button. There may be provided in the indentation 18 an attachment cylindrical recess 34 which could later be drilled to act as a securing means for the button.

A vacuum line 36 is placed behind the plastic insert 24 in the bottom platen 14 to have air drawn therethrough so as to hold the plastic insert 24 in place in the mold cavity 22. A two way valve 38 is connected between the vacuum line 36 and a suction pump 40 so as to normally draw the plastic insert into place in the mold cavity. In its second position, the two way valve 38 is adapted to cut off the suction pump 40 from the vacuum line 36 and apply a centrifugal pump 42 to the vacuum line 36 so as to force air through the line 36 and against the insert 24. This occurs when the platens 12 and 14 are separated and it is desired to remove the button from the mold cavity. The air forced through the line 36 by the pump 42 pushes the button out of the mold cavity.

A secondary vacuum system is also provided. This system consists of a vacuum line 44 through the bottom platen 14 connected to a vacuum ring 46. The vacuum ring 46 is directed to the periphery of the mold cavity 22 at spaced points through ports 48. The vacuum line 44 is connected through the valve 50 to a suction pump 52. The suction pump 52 is of a smaller capacity than the suction pump 40 for reasons that will be discussed below.

Molten thermoplastic material is injected peripherally into the mold cavity 22 through a port 56 in the side of the mold cavity 22. A gate 54 opens and closes the port 56. The molten material flows through runners 58 from a source of molding material (not shown) through the gate 54 and the port 56. The molding material may be injected through a pinpoint, parting line, or tunnel gate in a manner well known in the art. It has been shown as a parting line gate for purposes of illustration only.

The operation of the button making apparatus of FIGURES 1 and 2 is as follows:

In the beginning the platens 12 and 14 are separated by moving platen 14 downwardly and away from the platen 12. A plastic insert 24 having a decorative design on the face thereof is placed face up on the indentation 20 in the bottom platen 14.

The platen 14 is then moved upwardly to cooperate with the upper platen 12 to form the mold cavity 22 along the parting line 16. The valve 38 is then placed in the position shown in FIGURE 2 so that the pump 40 may draw air from behind the plastic insert 24, thus holding the plastic insert 24 securely in the indentation 20. The valve 50 is then operative to connect the suction pump 52 to the vacuum line 44, vacuum ring 46, and ports 48 so as to evacuate the mold cavity above the plastic insert 24. The vacuum pump 52 has a smaller capacity than the vacuum pump 40 so as not to interfere with the securement of the plastic insert 24 in the indentation 20. After the mold cavity is evacuated, the valve 50 closes and disconnects the suction pump 52 from the vacuum line 44.

At this point the molding material is supplied through the runner 58, the port 56 and the gate 54 peripherally into the mold cavity 22. Since the molding material is not forced to compress the air in the mold cavity, it flows freely into the mold cavity at a temperature less than is normally needed and fills the mold cavity. As the molding material fills the mold cavity 22, it forms the lip 32 around the flange 28 on the plastic insert 24. This lip secures the plastic insert to the back main body 30 formed by the molding material. The molding material also becomes bonded with the plastic insert as the surface area of the plastic insert will melt slightly so as to bond with the back main body 30. However, this melting of the face of the plastic insert 24 is very slight, and not enough to distort or in any other way damage or smear the decorated face of the plastic insert 24.

When the molded material has solidified, the lower platen 24 moves downwardly pulling the button including the plastic insert 24 and the back main body 30 with it. This is due to the suction by the vacuum pump 40 at the rear of the plastic insert 24. When the lower platen 14 has been moved out of communication with the upper platen 12, the valve 38 disconnects the vacuum pump 40 from the conduit 36 and connects the centrifugal pump 42 to the conduit 36. This forces air behind the button and ejects the finished product from the mold cavity.

Another embodiment of the present invention used to produce cups having decorative inserts fixedly attached thereto is shown in FIGURE 3 by the numeral 60. The molding apparatus 60 consists of an upper stationary mold part 62 and lower movable mold parts 64 and 66.

The upper mold part 62 has a mold face 68 which is shaped to form the inside of the cup. The movable parts 64 and 66 have indentations 70 and 72 respectively therein which form the outer shell of the cup to be molded. The movable mold parts 64 and 66 form party lines 74 and 76 respectively with the stationary mold part 62. The movable mold parts 64 and 66 have a party line 78 therebetween at the bottom of the cup to be molded.

A pre-molded plastic insert 80 is placed around the face 68 of the mold part 62 in the mold cavity 82 formed by the mold parts 62, 64 and 66. The plastic insert 80 is not shown as having decorative indentations on the face thereof but it is within the scope of this invention to have such decorative inserts placed therein at the discretion of the manufacturer.

The plastic insert 80 has an annular flange 84 therearound to provide a lip for securing the plastic insert 80 mechanically in the molded cup. The plastic insert 80 is held in place against the face 68 of the stationary mold part 62 by a vacuum system consisting of a conduit 36, valve 38, suction pump 40 and centrifugal pump 42, similar to those shown in FIGURE 2.

The air in the mold cavity around the insert 80 is removed through a vacuum system consisting of conduit 44, vacuum ring 46, port 48, valve 50 and suction pump 52, similar to those shown in FIGURE 2. The operation of the vacuum system is identical to the operation of the vacuum systems of FIGURE 2. The plastic insert 80 is held in place by the suction from the pump 40, which has a greater capacity than the suction pump 52. The area around the insert 80 in the mold cavity 82 is removed by the suction pump 52 and the valve 50 is closed. Then, molding material is injected into the mold cavity 82 through a gate and runner system (not shown) which could be a pinpoint, parting line, or tunnel gate. The molding material is preferably injected peripherally around the mold cavity walls so as to flow freely in the mold cavity and fill it simply and quickly.

When the mold is filled with the molding material it forms a lip around the annular flange 84 on the insert 80 to hold the insert 80 in place in the newly formed cup. The molding material injected into the mold cavity 82 is injected at a lower than normal temperature due to the partial vacuum in the mold cavity 82. This allows the plastic insert 80 to be only slightly melted at its outer face so as to adhere to the body of the cup. This slight melting will not be enough to in any way damage the pre-molded insert 80 or mar its decorative face. After the mold has set, and the cup is ready to be removed from the mold cavity 82, the movable mold parts 64 and 66 are moved horizontally out of communication with the mold cavity by their respective piston and cylinder motive power units 88 and 90.

The horizontal motive power system 88 operative to move the mold part 64 consists of a cylinder 94 having a piston 92 reciprocally mounted therein and fixedly secured at one end to the mold part 64. A pump 98 controlled by a valve 96 is operative to control movement of the piston 92 in the cylinder 94. Similarly, the horizontal motive power system 90 of the mold part 66 consists of a piston 100 reciprocally mounted in a cylinder 102 and fixedly secured at one end to the mold part 66. The movement of the piston 100 is controlled by a valve 104 operatively connected between the cylinder 102 and a pump 106. When the mold parts 64 and 66 have moved out of communiaction with the mold cavity 82, the cup remains on the face 68 of the stationary mold part 62. By moving the valve 38 so as to cut off the suction pump 40 from the conduit 36, the centrifugal pump 42 is connected to the conduit 36 so as to force the finished cup out of communication with the stationary mold part 62.

FIGURE 4 is another embodiment utilizing the principles of the present invention to mold eyeglasses or the like. This embodiment is generally designated by the numeral 108.

The apparatus 108 consists of an upper platen 110 and a lower platen 112 having a part line 111 therebetween. Either one or the other of platens 110 and 112 could be movable in accordance with the principles of the present invention.

The upper platen 110 has two similar indented surfaces 114 and 116 therein. The lower platen 112 has two similar indented surfaces 118 and 120 opposite indented surfaces 114 and 116 respectively. The indented surfaces 114 and 118 form an opening 122 therein. Similarly, the indented surfaces 116 and 120 form an opening 124 therebetween.

A molding cavity 126 joins the openings 122 and 124. The molding cavity 126 is adapted to be the bridge of an eyeglass frame. An annular mold cavity 128 surrounds the opening 122. A similar annular mold cavity 130 surrounds the opening 124. The annular mold cavities 128 and 130 will be utilized to mold the rims of the eyeglasses.

A pair of lenses 132 are adapted to be placed in the openings 122 and 124. Vacuum conduits 140 and 142 are connected through the upper platen 110 to the center portion of the indented faces 114 and 116 respectively. A rubber support strip 144 is permanently secured to the indented face 114. It is preferred that this rubber crush pad 144 be annular in shape so as to surround the opening in the indented face 114 through which the vacuum conduit 140 is received.

A similar rubber annular pad 146 is permanently secured to the indented face 116. The purpose of the rubber crush pads 144 and 146 is to prevent crushing of the lenses 132 by the vacuum securement of the lenses 132 in the openings 122 and 124. When suction is applied through the conduits 140 and 142 to secure the lenses 132 in their respective openings, the rubber pads 144 and 146 are pressed upwardly so as to cause an airtight seal between the annular rubber pads 144 and 146 and the lens 132. This small suction area inside the annular pads 144 and 146 is sufficient to hold the lenses 132 in place.

Two additional annular rubber crush pads 148 and 150 are placed around the periphery of the opening 122 on indented faces 114 and 118 respectively. When the lens 132 is in place and the upper and lower platens 110 and 112 are brought together, the annular rings 148 and 150 provide a complete seal around the edge of the lens 132. However, the lens 132 has a greater diameter than the annular rubber pads 148 and 150 so that an annular flange of the lens 132 extends into the annular rim cavity 128.

Similar annular pads 152 and 154 are disposed within the opening 124 adjacent the periphery of the lens 132. An annular flange of the lens 132 similarly extends into the rim mold cavity 130.

A gate and runner 156 of the parting line type injects the molding material into the mold cavities 128, 126 and 130 peripherally of the mold cavities.

A secondary vacuum line 158 is centrally located with respect to the bridge mold cavity 126 so as to uniformly create a vacuum in these mold cavities.

The operation of the molding apparatus shown in FIGURE 4 is as follows:

The platens 110 and 112 are separated. Lenses 132 are positioned in the indented faces 114 and 116 respectively. The vacuum created by pumps (not shown) connected to the conduits 140 and 142 holds the lenses 132 in place. The platens 110 and 112 are then brought together so as to form a seal around the edge of the lenses 132 through annular rings 148, 150, 152 and 154. The mold cavities 126, 128 and 130 are exhausted by the pump (not shown) connected to the secondary vacuum conduit 158. After the mold cavities have been exhausted, molding material is injected peripherally around the mold cavities through the runner in gate 156. The molded material forms a flange around the edge of the lenses 132 and a bridge therebetween.

When the molding operation is completed, the platens 110 and 112 are separated, and the finished eyeglass is ejected from the top platen 110 by removing the vacuum from the conduits 140 and 142 and applying air under pressure therethrough.

The present invention may be embodied in other specific forms without departing from the spirit or essential attributes thereof and, accordingly, reference should be made to the appended claim, rather than to the foregoing specification as indicating the scope of the invention.

I claim:

Molding apparatus comprising at least two mold parts forming two mold cavities therebetween, said cavities being annular in cross-section at their outer peripheries, the portions of said mold cavities adjacent their outer peripheries being thinner than the central portions and the outer peripheral portions of said cavities, first vaccum means for holding a pre-molded insert juxtaposed to a central portion of one wall of each of said mold cavities in a central portion of each of said cavities, cushioning means secured to said wall of each cavity to prevent crushing of said pre-molded insert, a bridging cavity between each of said mold cavities, a second vacuum means in communication with said bridging cavity for evacuating said mold cavities, said second vacuum means being of lesser capacity than said first vacuum means, and means for injecting molding material into said cavities.

References Cited by the Examiner

UNITED STATES PATENTS

| | | | |
|---|---|---|---|
| 2,064,514 | 12/1936 | Balz. | |
| 2,094,823 | 10/1937 | Sample et al. | |
| 2,193,935 | 3/1940 | Mulcahy | 18—59 |
| 2,199,144 | 4/1940 | Tegarty | 18—55 |
| 2,304,461 | 12/1942 | Knowles. | |
| 2,668,985 | 2/1954 | Babbitt. | |
| 2,723,433 | 11/1955 | Van Buren | 24—90 |
| 2,845,657 | 8/1958 | Beare | 18—36 |
| 2,913,036 | 11/1959 | Smith. | |
| 2,928,151 | 3/1960 | Rozanski | 240—90 |
| 3,027,598 | 4/1962 | Neefe | 18—59 |
| 3,037,652 | 6/1962 | Wallace | 264—335 |
| 3,068,522 | 12/1962 | Nickerson et al. | 18—36 |
| 3,122,598 | 2/1964 | Berger | 264—247 |

FOREIGN PATENTS

| | | |
|---|---|---|
| 1,255,820 | 1/1961 | France. |
| 296,417 | 4/1954 | Switzerland. |

ROBERT F. WHITE, *Primary Examiner.*

WILLIAM J. STEPHENSON, F. MARLOWE,
*Examiners.*